Sept. 3, 1935.       F. J. PARDIECK       2,013,578
VALVE HANDLE
Filed May 12, 1934

Inventor
FRANK J. PARDIECK,

By
Attorneys

Patented Sept. 3, 1935

2,013,578

UNITED STATES PATENT OFFICE 2,013,578

VALVE HANDLE

Frank J. Pardieck, Indianapolis, Ind.

Application May 12, 1934, Serial No. 725,244

6 Claims. (Cl. 287—53)

My invention relates to valve handles of the type commonly used to control the supply of steam or hot water to a radiator. Such valve handles are commonly of some molded composition material and usually embody provisions for attachment to the squared end of the rotatable valve stem.

It is the object of my invention to produce a valve handle of this type having readily adjustable provisions by means of which it may be tightly secured to squared valve-stem-ends of different dimensions.

In carrying out my invention I employ a cylindrical collar or sleeve having an internal diameter large enough to receive any valve stem with which the handle is to be used; and at diametrically opposite points, I provide this sleeve with tapped holes for the reception of radially extending screws. Each of these screws has in its inner end a deep V-shaped groove for the reception of one corner of the squared end of the valve stem. The valve handle proper, which is usually of a generally circular conformation, has in its lower surface a circular recess adapted to receive the sleeve, and a diametrically extending groove adapted to receive those portions of the screws which project radially outward beyond the sleeve. Any convenient means, such as a screw extending through the handle into the end of the valve stem, is employed for holding the handle in place.

Figure 1:
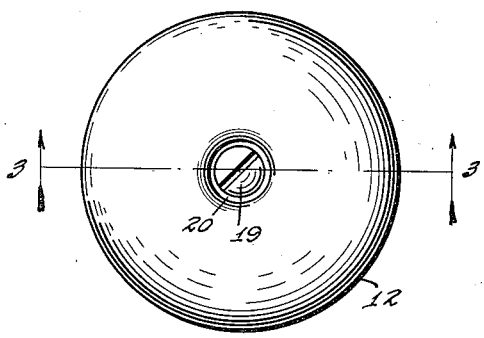
Figure 2:
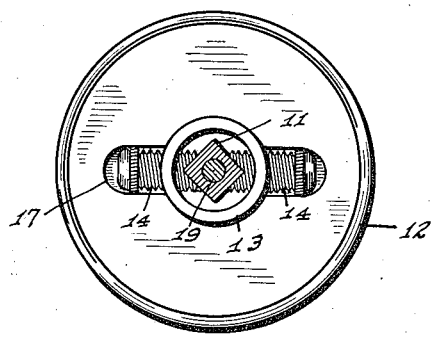
Figure 3:
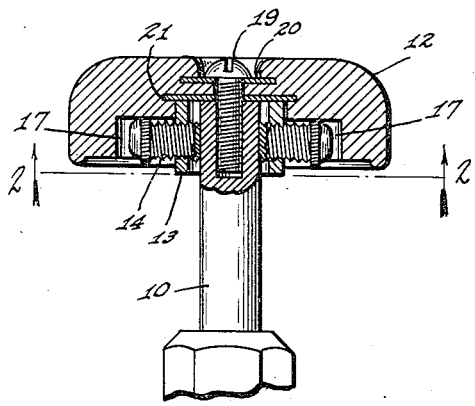
Figure 4:
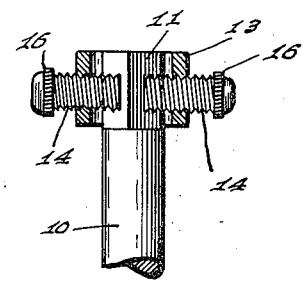
Figure 5:
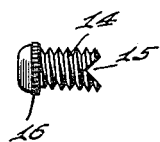

The accompanying drawing illustrates my invention: Fig. 1 is a plan view of the valve handle; Fig. 2 is a horizontal section on the line 2—2 of Fig. 3; Fig. 3 is a vertical axial section on the line 3—3 of Fig. 1; Fig. 4 is a view similar to Fig. 3, but with the body of the handle removed; and Fig. 5 is a plan view of one of the screws above referred to.

A valve stem 10 in association with which my invention is to be used has its end 11 formed in a polygonal, usually a square, cross-section. The polygonal cross-section is employed to prevent relative rotation of the valve and its associated handle 12. In using my invention to mount a handle 12 on a valve stem such as that indicated at 10, I employ a cylindrical collar or sleeve 13 large enough to receive the end of any valve stem with which the handle is to be used. At diametrically opposite points, the sleeve 13 is provided with screw-threaded holes for the reception of radially extending screws 14. Each of these screws is provided in its inner end face with a diametrically extending groove 15, V-shaped in cross-section to enable it to embrace one corner of the polygonal end 11 of the valve stem 10.

Near its outer end, each of the screws 14 may be provided with a knurled head 16 to facilitate its adjustment.

In its lower surface, the valve handle 12 is provided with a recess for the reception of the sleeve 13. In addition, there is also provided in the lower surface of the valve handle a diametrically extending groove 17 adapted to receive those portions of the screws 14 which project radially outward beyond the sleeve 13.

To secure the valve handle 12 on the end of the stem 10, it is provided with a central opening for the passage of a screw 19 which enters an axial screw-threaded hole in the end of the valve stem, as is clear from Fig. 3. Washers 20 and 21 may be provided beneath the head of the screw 19 and in the bottom of the sleeve-receiving recess in the handle 12. If the handle is made of a molded composition, the washers 20 and 21 may be molded in place, as is indicated in Fig. 3.

Preferably, in order to prevent relative rotation of the handle 12 and sleeve 13, the screws 14 have a tight fit in the groove 17, thus making it impossible, or at least difficult, to rotate the screws when the handle is in place. Therefore, the sleeve 13 and its associated screws 14 may be removed from the handle 12 when it is desired to adjust the screws to a particular valve-stem-end 11. With the sleeve removed from the handle, the screws 14 are adjusted until their inner ends are at such a distance apart that the walls of the grooves 15 will rather tightly engage the faces of the valve-stem-end 11 when the sleeve 13 is placed therein. This adjustment of the screws must, of course, be effected with the sleeve removed from the end of the valve stem, as the presence of the valve-stem-end in the grooves 15 prevents rotation of the screws. Preferably, the ends of the screws are brought so close together that the sleeve will have to be forced, as by tapping, over the valve-stem-end. In adjusting the screws to fit a valve-stem-end, the screws should be adjusted equally so that the sleeve 13 will be substantially concentric with the valve stem.

After the screws 14 have been properly adjusted to fit the valve-stem-end, as indicated in Fig. 4, the handle 12 is put in place and secured by the screw 19. The outwardly extending ends of the screws 14, fitting within the groove 17, serve to key the handle to the valve-stem and prevent relative rotation of those two elements, thus insuring that the valve handle will not become loose in service. The adjustment of the screws 14 can not change while the handle is in place, because the presence of the valve-stem-end in the grooves 15 prevents rotation of the screws.

I claim as my invention.

1. In combination with a rotatable valve stem having an end portion polygonal in cross-section, a sleeve adapted to receive such valve-stem-end, two diametrically opposite screws mounted in said sleeve and extending radially thereof, the inner ends of said screws being provided with transverse grooves adapted to receive opposite edges of said valve-stem-end, a valve-handle, said valve-handle being provided in its lower surface with a recess for the reception of said sleeve and with a diametrically extending groove for the reception of said screws, and means for holding said handle in place on the valve-stem.

2. In combination with a rotatable valve stem having an end portion polygonal in cross-section, a sleeve adapted to receive such valve-stem-end, two relatively adjustable members carried by said sleeve in position to receive said valve-stem-end between them, one of said members comprising a radially disposed screw mounted in said sleeve and having in its inner end a transversely extending groove adapted to receive one edge of said valve-stem-end, a valve handle provided in its lower face with a recess for the reception of said sleeve and with a radial groove for the reception of said screw, and means for holding said handle in place on the valve-stem.

3. In combination, a valve stem, a handle therefor, an intermediate member, means carried by said intermediate member for engaging said valve-stem, said means comprising a screw mounted in said intermediate member on an axis transverse to that of said valve-stem, said screw and valve-stem having co-operating provisions which, when engaged, prevent rotation of the screw in the intermediate member and rotation of the intermediate member on the valve-stem, and means for holding said handle in place on said valve-stem in association with said intermediate member.

4. The invention set forth in claim 3 with the addition that said handle is provided with a radial groove for the reception of said screw.

5. In combination, a valve-stem, a handle therefor, a sleeve loosely receiving the end of said valve-stem, a valve-stem screw mounted in said sleeve and having means at the one end to non-rotatably engage the stem and projecting radially outward from said sleeve, said handle being provided in its lower surface with a central recess for the reception of said sleeve and with a radially extending supplementary recess closely embracing the projecting portion of said screw, and means for holding said handle in place on said valve-stem in association with said sleeve.

6. In combination, a valve-stem, a handle therefor, a sleeve loosely receiving the end of said valve-stem, a valve-stem screw mounted in said sleeve and having means at the one end to non-rotatably engage the stem and projecting radially outward from said sleeve, said handle being provided in its lower surface with a central recess for the reception of said sleeve and with a radially extending supplementary recess closely embracing the projecting portion of said screw, the outer end of said supplementary recess being closed to cover the end of said screw, and means for holding said handle in place on said valve-stem in association with said sleeve.

FRANK J. PARDIECK.